United States Patent
Sata et al.

(10) Patent No.: US 10,712,716 B2
(45) Date of Patent: Jul. 14, 2020

(54) CONTROL DEVICE

(71) Applicants: Kota Sata, Susono (JP); Junichi Kako, Susono (JP); Satoru Watanabe, Susono (JP); Yuta Suzuki, Nagoya (JP); Masato Edahiro, Nagoya (JP)

(72) Inventors: Kota Sata, Susono (JP); Junichi Kako, Susono (JP); Satoru Watanabe, Susono (JP); Yuta Suzuki, Nagoya (JP); Masato Edahiro, Nagoya (JP)

(73) Assignees: TOYOTA JIDOSHA KABUSHIKI KAISHA, Toyota-shi (JP); NATIONAL UNIVERSITY CORPORATION NAGOYA UNIVERSITY, Nagoya-shi (JP)

( * ) Notice: Subject to any disclaimer, the term of this patent is extended or adjusted under 35 U.S.C. 154(b) by 569 days.

(21) Appl. No.: 14/768,635

(22) PCT Filed: Feb. 12, 2014

(86) PCT No.: PCT/JP2014/053178
§ 371 (c)(1),
(2) Date: Aug. 18, 2015

(87) PCT Pub. No.: WO2014/129355
PCT Pub. Date: Aug. 28, 2014

(65) Prior Publication Data
US 2016/0018794 A1    Jan. 21, 2016

(30) Foreign Application Priority Data

Feb. 21, 2013 (JP) .................. 2013-032322

(51) Int. Cl.
*G05B 11/42* (2006.01)
*G05B 17/02* (2006.01)
*G05B 11/36* (2006.01)

(52) U.S. Cl.
CPC .............. *G05B 11/42* (2013.01); *G05B 11/36* (2013.01); *G05B 17/02* (2013.01); *G05B 2219/23217* (2013.01)

(58) Field of Classification Search
CPC ........ G05B 11/36; G05B 11/42; G05B 17/02; G05B 2219/23217
(Continued)

(56) References Cited

U.S. PATENT DOCUMENTS 4,993,386 A     2/1991 Ozasa et al.
5,481,723 A *   1/1996 Harris ..................... G06F 8/452
                                                          717/150
(Continued)

FOREIGN PATENT DOCUMENTS

JP    2010-160537 A    7/2010

OTHER PUBLICATIONS

Abe et al. "Smith Predictor Control and Internal Model Control—A Tutorial", Aug. 4-6, 2003, Fukui University, Japan, 1383-1387 ( Year: 2003).*

(Continued)

*Primary Examiner* — Santosh R Poudel
(74) *Attorney, Agent, or Firm* — Hunton Andrews Kurth LLP

(57) ABSTRACT

A control device according to the present invention includes a plurality of arithmetic units that operate in parallel. A sensor value of the control amount is input to the first arithmetic unit in a signal transmission sequence, and a correction amount for the manipulation amount is output from the last arithmetic unit in the signal transmission sequence. The first arithmetic unit has a controller that produces an output by processing the input sensor value, and the arithmetic units other than the first arithmetic unit has a delay element that delays an input by a predetermined (Continued)

number of steps and a controller that produces an output by processing the delayed input.

12 Claims, 5 Drawing Sheets

(58) Field of Classification Search
USPC .......................................................... 700/4
See application file for complete search history.

(56) References Cited

U.S. PATENT DOCUMENTS

| | | | |
|---|---|---|---|
| 5,568,378 A | 10/1996 | Wojsznis | |
| 5,748,467 A | 5/1998 | Qin et al. | |
| 5,838,599 A | 11/1998 | Tao et al. | |
| 5,901,059 A * | 5/1999 | Tao ...................... | G05B 13/048 |
| | | | 700/29 |
| 5,983,875 A * | 11/1999 | Kitagawa ............ | F02D 41/1402 |
| | | | 123/674 |
| 6,185,468 B1 | 2/2001 | Wells | |
| 8,698,469 B1 * | 4/2014 | Latham, II .............. | H02M 1/15 |
| | | | 323/283 |
| 2003/0033075 A1 | 2/2003 | Yasui et al. | |
| 2003/0106544 A1 | 6/2003 | Davis et al. | |
| 2003/0116123 A1 * | 6/2003 | Ito ...................... | F02D 41/0057 |
| | | | 123/299 |
| 2007/0038987 A1 * | 2/2007 | Ohara ...................... | G06F 8/45 |
| | | | 717/151 |
| 2007/0131208 A1 | 6/2007 | Okazaki et al. | |
| 2008/0216074 A1 * | 9/2008 | Hass ................... | G06F 12/1036 |
| | | | 718/100 |
| 2009/0138172 A1 * | 5/2009 | Okazaki .................. | F01N 3/101 |
| | | | 701/103 |
| 2010/0057324 A1 | 3/2010 | Glugla et al. | |
| 2010/0169892 A1 * | 7/2010 | Stam ...................... | G06F 9/5027 |
| | | | 718/105 |
| 2011/0001529 A1 | 1/2011 | Gendai | |
| 2011/0197047 A1 * | 8/2011 | Hiroshi ............... | G06F 17/5045 |
| | | | 712/29 |
| 2012/0095658 A1 * | 4/2012 | Yasui .................. | F02D 41/1403 |
| | | | 701/60 |
| 2012/0170639 A1 * | 7/2012 | Salsbury .............. | G05B 13/048 |
| | | | 375/233 |
| 2013/0036295 A1 * | 2/2013 | Jiva ...................... | G06F 12/0269 |
| | | | 712/220 |
| 2013/0037121 A1 * | 2/2013 | Kiesbauer ........... | F04D 15/0022 |
| | | | 137/14 |
| 2013/0232346 A1 | 9/2013 | Wu | |
| 2013/0338934 A1 * | 12/2013 | Asadi ...................... | G06F 19/22 |
| | | | 702/20 |
| 2014/0229089 A1 * | 8/2014 | Jankovic ................. | F02D 41/30 |
| | | | 701/104 |
| 2014/0344825 A1 * | 11/2014 | Suzuki .................. | G06F 9/5022 |
| | | | 718/103 |
| 2015/0378335 A1 | 12/2015 | Sata et al. | |

OTHER PUBLICATIONS

A. Wills et al., "Fast Linear Model Predictive Control Via Custom Integrated Circuit Architecture," IEEE Transactions on Control Systems Technology, IEEE Service Center, New York, NY, vol. 20, No. 1, Jan. 1, 2012, pp. 59-71. (European Search Report dated Jun. 7, 2016).

S. Craciun et al., "A Parallel Hardware Architecture for Information-theoretic Adaptive Filtering," High-Performance Reconfigurable Computing Technology and Applications (HPRCTA), 2010 Fourth International Workshop On, IEEE, Piscataway, New Jersey, US, Nov. 14, 2010, pp. 1-10. (European Search Report dated Jun. 7, 2016).

U.S. Patent and Trademark Office, Office Action in U.S. Appl. No. 14/768,606, dated Sep. 22, 2017, 24 pages.

Non-Final Office Action dated May 17, 2018; issued by the U.S. Appl. No. 14/768,606; 15 pages.

Notice of Allowance issued in U.S. Appl. No. 14/768,606, dated Sep. 18, 2018. 31 pages.

United States Patent and Trademark Office, Supplemental Notice of Allowability issued to U.S. Appl. No. 14/768,606 dated Nov. 23, 2018, 6 pages.

* cited by examiner

CONTROL DEVICE

CROSSS-REFERENCE TO RELATED APPLICATIONS

This is a national phase application based on the PCT International Patent Application No PCT/JP2014/053178 filed Feb. 12, 2014, claiming priority to Japanese Patent Application No. 2013-032322 filed Feb. 21, 2013, the entire contents of both of which are incorporated herein by reference.

TECHNICAL FIELD

The present invention relates to a control device and particularly to a control device that handles a physical phenomenon. In particular, it relates to a control device that determines a manipulation amount of a control object by feedback control.

BACKGROUND ART

Computational power of a computing device can be improved by increasing the operational frequency of the core. Depending on the environment of the computing device, however, the operational frequency may be unable to be increased. And from the viewpoint of power efficiency, there is a limit to improving the performance by increasing the operational frequency. In recent years, as disclosed in Japanese Patent Laid-Open No. 2010-160537, multi-core parallel computing devices with a plurality of cores mounted on a single semiconductor chip have been attracting attention. The multi-core parallel computing devices require lower operational frequency than single-core computing devices, provided that the amount of computation is the same. In addition, since tasks to be processed are allocated to the plurality of cores for parallel computation, the operating time can be reduced compared with the case where a single core performs the computation.

Advantageous applications of such a parallel computing device include a real-time control device. To control the operation or state of a complicated control object, the real-time control device uses a control algorithm that involves many numerical calculations. In particular, with a vehicle control device, which is a kind of the real-time control device, the control algorithm has becoming larger in scale and becoming more complicated year by year in order to meet the market and regulatory requirements. Thus, the operational load is increasing, and a single-core central processing unit (CPU) will probably become unable to complete the computation in the control period. Application of the parallel computing device to the real-time control device is expected as effective means for avoiding such a situation.

CITATION LIST

Patent Literature

Patent Literature 1
  Japanese Patent Laid-Open No. 2010-160537

SUMMARY OF INVENTION

Technical Problem

However, simply applying the parallel computing device to the control device is not sufficient to satisfactorily improve the performance of the control device. Conventionally, the control algorithm is parallelized in the software design phase. However, if the control algorithm is highly sequential, there is a limit to parallelization in the software design phase, that is, parallelization at the source code level. According to Amdahl's law, supposing that a program, the rate of the execution time of the part of which that can be parallelized is a, is executed using N cores, the rate S of performance improvement as a whole is expressed as $S=1/((1-a)+a/N)$. As can be seen from this formula, with a program only a small part of which can be parallelized, the performance is difficult to improve in one step. In addition, since an actuator output occurs in response to a sensor input in each step, it is also difficult to take advantage of the parallelism of multiple cores to perform stream processing of the input data. In addition, since the parallelization involves an overhead, there is also a limit to parallelization based on division of the task into fine-grain tasks with a reduced amount of computation on a plan or module basis or to parallelization based on division of the loop. This is because, as the number of divisions increases, the cost of computation synchronization between the cores, communication of the computation results and the like increases, so that the expected performance becomes unable to be achieved by the parallel computation.

The difficulty of the parallelization at the source code level of a control algorithm that is highly sequential can be specifically described with reference to a real-time control device and, in particular, a control logic of a control device that handles a physical phenomenon. Control objects of such a control device have more or less a dead time, so that a control theory applicable to a time delay system can be used as the control algorithm. A representative time delay system control is an internal model control (IMC) that uses a prediction model, which is a model of a control object, to perform feedback control. In the following, a control logic of the internal model control used for a conventional control device and problems with parallelization of the control logic will be described.

FIG. 6 is a block diagram showing a control logic of a typical internal model control used for a conventional control device. A control object 2 has a dead time L, and a transfer function thereof can be expressed by $Pe^{-Ls}$. In the internal model control, a feedback system including a prediction model 102, which is a model of the control object 2, and an IMC filter 101 is built. The prediction model 102 is a model of the control object 2 including the dead time L, so that a transfer function thereof can be expressed as $Me^{-Ls}$. Although the transfer function $Me^{-Ls}$ of the prediction model 102 and the true transfer function $Pe^{-Ls}$ of the control object 2 ideally perfectly agree with each other, there is actually a modeling error between the transfer functions. A transfer function Cimc of the IMC filter 101 is defined as an inverse of a minimum phase element of the transfer function of the prediction model 102. The IMC filter 101 calculates a manipulation amount u for an actuator of the control object 2 based on a target value r of a control amount. The manipulation amount u and a disturbance d are input to the control object 2, and a sensor value y of the control amount affected by the disturbance d is obtained from the control object 2. The "sensor value" means a measurement value of the control amount measured by a sensor. The prediction model 102 is arranged in parallel with the control object 2, and the manipulation amount u is also input to the prediction model 102. A difference between the sensor value y and an output of the prediction model 102 is fed back to the target value r through a disturbance compensator 103, which is shown as a transfer function Cdis.

In the control logic shown in FIG. 6, operations of the three controllers, the prediction model 102, the IMC filter 101 and the disturbance compensator 103, are sequential. The operational sequentiality can be shown by arranging the processings of the controllers on the time axis. FIG. 7 is a diagram showing a temporal relationship between the operations of the controllers in a case where the control logic described above is implemented in a conventional single-core computing device. In FIG. 7, the horizontal axis is the time axis, and the processings in one step are arranged on the time axis. As shown in this drawing, output of the manipulation amount u to the control object 2, operation according to the prediction model ($Me^{-Ls}$) 102, subtraction of the sensor value y, operation by the disturbance compensator (Cdis) 103, subtraction of the target value r, and operation by the IMC filter (Cimc) 101 are sequentially performed to calculate a manipulation amount u' for the next step.

The control logic described above can be implemented in a multi-core computing device. When the control logic described above is implemented in a multi-core computing device, the processings in one step need to be divided into a plurality of tasks, and the tasks need to be allocated to the cores. In this example, discretization is performed on the basis of the three controllers, and then, the resulting tasks are allocated to the three cores. The addition and subtraction of the sensor value y and the addition and subtraction of the target value r are included in the preceding or following task. FIG. 8 is a diagram showing a temporal relationship between the processings in a case where the processings are allocated to a plurality of cores in this way. Each core has only to process a part of the tasks, so that the operating time of each core is reduced compared with the case where a single core performs all the processings. However, even if a plurality of cores is used for processing, the operational sequentiality is maintained, so that any task for any controller cannot be started before the task for the preceding controller is completed. That is, the plurality of cores is not allowed to perform the respective tasks at the same time, so that the processing of one step cannot be sped up as a whole of the computing device. As can be seen from the above description, even if the control logic described above is implemented in a multi-core computing device, parallelization is allowed only at the source code level, so that the operating time cannot be substantially reduced by such parallelization.

Another possibility is parallelization at the control logic level rather than the source code level. An update formula for the manipulation amount in the internal model control is considered. The following formula (1) is an update formula for the manipulation amount for the control logic shown in FIG. 6. The variables and transfer functions in the update formula correspond to the variables and transfer functions of the controllers in the control logic shown in FIG. 6.

[Formula 1]

$$u=\{r-(y-u*M(s)e^{-Ls})*Cdis(s)\}*Cimc(s) \quad (1)$$

As can be seen from the update formula, the operational sequentiality involved with inputs and outputs between the tasks shown in FIG. 8 is caused by the parenthesization of the additions and subtractions in the update formula. That is, although additions and subtractions performed on a plurality of elements are implicitly synchronized between the cores, a sequential order occurs between the tasks once the additions and subtractions are parenthesized. Thus, to eliminate the sequentiality caused by the parenthesization, the formula is expanded into terms relating to the variables r, y and u. Such a transformation of the formula (1) results in another update formula expressed by the following formula (2).

[Formula 2]

$$u=r*Cimc(s)-y*Cdis(s)*Cimc(s)+u*M(s)e^{-Ls}*Cdis(s)*Cimc(s) \quad (2)$$

FIG. 9 is a block diagram showing a control logic that corresponds to the formula (2). As can be seen from the relationship between the formulas (1) and (2), the control logic shown in FIG. 9 is an equivalent transformation of the control logic shown in FIG. 6. In the equivalent transformation, one disturbance compensator (Cdis) and two IMC filters (Cimc) are duplicated. According to the control logic shown in FIG. 9, the manipulation amount u is fed back to the manipulation amount u itself through the prediction model ($Me^{-Ls}$) 112, the disturbance compensator (Cdis) 113 and the IMC filter (Cimc) 114, and at the same time, the sensor value y is fed back to the manipulation amount u through the disturbance compensator (Cdis) 115 and the IMC filter (Cimc) 116.

Operations of the terms relating to the variables r, y and u that are not parenthesized in the formula (2) are divided as separate tasks, and the tasks are allocated to the three cores. In addition, the additions and subtractions for calculating the manipulation amount u' for the next step from the outputs of the tasks are allocated to any of the cores. FIG. 10 is a diagram showing a temporal relationship between the processings in a case where the processings are allocated to the plurality of cores in this way. In FIG. 10, the horizontal axis is the time axis, and the processings in one step are arranged on the time axis. In this drawing, a task 1 is allocated to a core 1, tasks 2 and 3 are allocated to a core 2, and tasks 4, 5 and 6 are allocated to a core 3. Since what is input to each core for the task(s) is a different one of the variables r, y and u, so that any core can start processing the task(s) without waiting for another core to complete its task(s). That is, when the control logic shown in FIG. 9 is implemented in a multi-core computing device, the cores can start operation in parallel.

However, in actual, the operating time per step in the flow shown in FIG. 10 is not shorter than the operating time per step in the flow shown in FIG. 7 or 8. This is because the task relating to the term of the manipulation amount u includes operations relating to all the controllers. Specifically, the task includes the operation according to the prediction model ($Me^{-Ls}$) (task 4), the operation by the disturbance compensator (Cdis) (task 5) and the operation by the IMC filter (Cimc) (task 6). Thus, the process is no more efficient than the process of the conventional single core computing device. On the contrary, the operating time per step may increase since the results of the operations of the tasks by the cores are gathered at one core to perform additions and subtractions and therefore the cost increases.

Furthermore, the task relating to the term of the sensor value y includes the operation by the disturbance compensator (Cdis) (task 2) and the operation by the IMC filter (Cimc) (task 3). Therefore, the time required for processing of the task relating to the term of the sensor value y is the second longest after the time required for processing of the task relating to the term of the manipulation amount u. If the time required for processing of the task relating to the term of the manipulation amount u can be reduced, the next problem is to reduce the time required for processing of the task relating to the term of the sensor value y. If the tasks are distributed among a plurality of cores to perform parallel operation, it is desirable that the task allocated to each core is as small as possible, and the tasks are allocated to the cores as uniformly as possible.

The present invention has been devised in view of the problems described above. An object of the present invention is to provide a control device that determines a manipulation amount of a control object by feedback control so as to bring a control amount of the control object closer to a target value and reduces an operating time by parallelizing an operation involved with the feedback control.

Solution to Problem

A control device according to the present invention is configured to determine a manipulation amount of a control object by feedback control so as to bring a control amount of the control object closer to a target value. The feedback control according to the present invention may be PI control, PID control, internal model control or control by Smith method, for example.

The control device according to the present invention includes a plurality of arithmetic units that operate in parallel. Preferably, the control device according to the present invention is implemented in a multi-core processor that has a plurality of cores, and a different core is used as each of the plurality of arithmetic units. Alternatively, each of the plurality of arithmetic units may be configured as a single core or a multi-core processor.

The arithmetic units are configured so that a signal is sequentially transmitted by the arithmetic units. Furthermore, the arithmetic units are configured so that a sensor value of the control amount is input to the first arithmetic unit in a signal transmission sequence, and a correction amount for the manipulation amount is output from the last arithmetic unit in the signal transmission sequence. That is, the arithmetic units form a closed loop that feeds the sensor value of the control amount back to the manipulation amount for the next step.

The first arithmetic unit in the signal transmission sequence has a controller that produces an output by processing the sensor value of the control amount. The other arithmetic units have a delay element that delays an input by a predetermined number of steps and a controller that produces an output by processing the input delayed by the delay element. The number of steps by which each delay element delays the input is preferably one. The total delay time of the signal transmitted by the arithmetic units is determined by the total number of delay elements and the control period of the control device. The total delay time is a delay time newly introduced by the present invention for parallel operation of the controllers. A conventional control system comprising a control device and a control object inherently has a potential delay time including a dead time of the control object. With the arithmetic units of the control device according to the present invention, the total delay time for parallelization is selected not to cause a problem in control performance. Specifically, the total delay time for parallelization is preferably as small as possible. In particular, the total delay time for parallelization is preferably equal to or less than a half the setting time.

Preferably, the arithmetic units are configured so that the amount of operation of the controller is uniform between the arithmetic units. When the feedback control according to the present invention is the internal model control or an equivalent transformation thereof, the controller can include an element such as an IMC filter or a disturbance compensator.

When the feedback control according to the present invention is the internal model control or an equivalent transformation thereof, the control device preferably includes the second closed loop described below.

The second closed loop includes a plurality of arithmetic units that operate in parallel and is configured so that a signal is sequentially transmitted by the arithmetic units. Furthermore, the second closed loop is configured so that the manipulation amount of the control object is input to the first arithmetic unit in the signal transmission sequence, and the correction amount for the manipulation amount is output from the last arithmetic unit in the signal transmission sequence.

Each of the arithmetic units forming the second closed loop has a delay element that delays an input by a predetermined number of steps and a controller that produces an output by processing the input delayed by the delay element. The number of steps by which each delay element delays the input is preferably one. The total delay time of the signal transmitted by the arithmetic units is determined by the total number of delay elements and the control period of the control device. The arithmetic units of the second closed loop are configured so that the sum of the total delay time of the delay elements and the total dead time of the controllers is equal to the sum of the dead time of the control object and the total delay time of the delay elements of the first closed loop.

The arithmetic units forming the second closed loop are preferably configured so that the amount of operation of the controller is uniform between the arithmetic units. The controller can include an element such as a prediction model of the control object that ignores the dead time, a dead time element, an IMC filter and a disturbance compensator. The dead time of the dead time element is the sum of the dead time of the control object and the total delay time of the delay elements of the first closed loop minus the total delay time of the delay elements of the second closed loop. An appropriate combination of these elements forms the controller. Preferably, a controller including the prediction model that ignores the dead time, a controller including the dead time element, a controller including the IMC filter and a controller including the disturbance compensator are separately provided.

Advantageous Effects of Invention

As described above, with the control device according to the present invention, operations involved with the feedback control are allocated to a plurality of arithmetic units in a distributed manner. Furthermore, delay elements for a predetermined number of steps are introduced to the second and following arithmetic units in the signal transmission sequence, and the output of another arithmetic unit for a step preceding the current step by the predetermined number of steps is input to the controller of each of these arithmetic units. Therefore, the arithmetic units can start their respective operations at the same time without waiting for another arithmetic unit to complete its operation. That is, with the control device according to the present invention, the operating time of the whole of the control device is reduced by parallelization of the operations by the feedback control.

DESCRIPTION OF EMBODIMENT

First, before describing an embodiment of the present invention, a control device (referred to as a reference device, hereinafter) examined in the course of creation of the present invention will be described.

In the examination of a control logic of an internal model control of the reference device, attention is focused on the term of the manipulation amount u in the formula (2) described above. The term of the manipulation amount u includes the transfer function $Me^{-Ls}$ of the prediction model, and the transfer function $Me^{-Ls}$ of the prediction model includes the dead time L. Supposing that the dead time L is longer than three control periods T, an update formula of the manipulation amount u expressed by the following formula (3) is obtained by deriving three $e^{-Ts}$ from $e^{-Ls}$ in the formula (2) and distributing the three $e^{-Ts}$ to the elements. Note that it is assumed that all the transfer functions involved with the internal model control are linear transfer functions.

[Formula 3]

$$u = r*Cimc(s) - y*Cdis(s)*Cimc(s) + u*e^{-Ts}M(s)*e^{-Ts} \\ e^{-(L-4T)}*e^{-Ts}Cdis(s)*e^{-Ts}Cimc(s) \quad (3)$$

Figure 4:
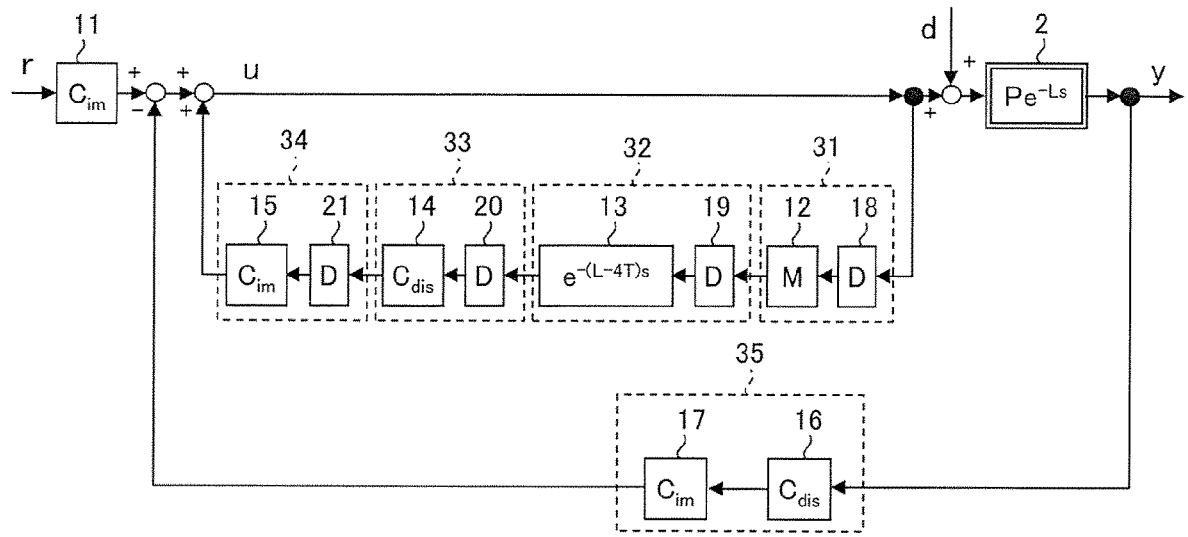
FIG. 4 is a block diagram showing a control logic of an internal model control of a control device examined in the course of creation of the present invention.
Figure 9:
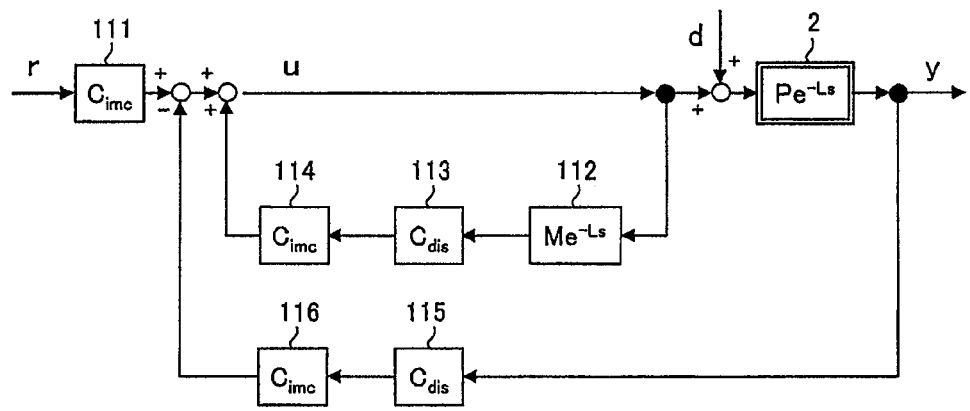
FIG. 9 is a block diagram showing a control logic of an internal model control obtained by equivalent transformation of the control logic shown in FIG. 6.
Figure 10:
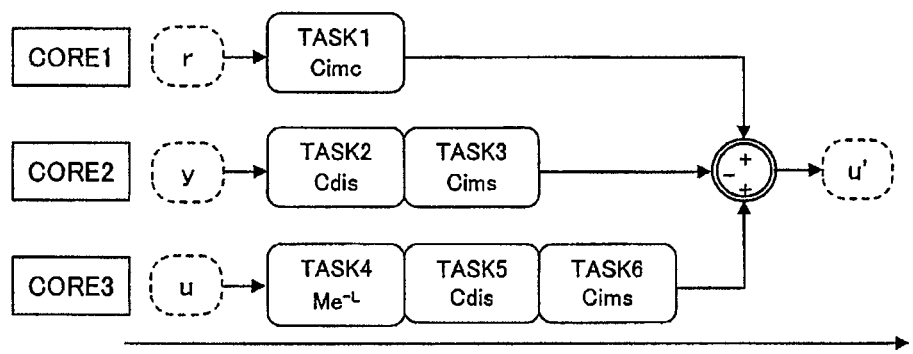
FIG. 10 is a diagram showing a temporal relationship between operations of controllers in a case where the control logic shown in FIG. 9 is implemented in a multi-core computing device.

FIG. 4 is a block diagram showing the control logic of the internal model control of the reference device. The control logic shown in FIG. 4 corresponds to the formula (3) described above. As can be seen from the relationship between the formulas (2) and (3), the control logic shown in FIG. 4 is an equivalent transformation of the control logic shown in FIG. 9.

With the reference device, a target value r of a control amount is input to an IMC filter (Cimc) 11. The IMC filter 11 outputs a manipulation amount u, and the manipulation amount u and a disturbance d are input to a control object ($Pe^{-Ls}$) 2, which is to be controlled. In the reference device, two closed loops are formed. A first closed loop is a closed loop that calculates a correction amount from a sensor value y of the control amount output from the control object 2 and feeds the correction amount back to the manipulation amount u for the next step. A second closed loop is a closed loop that calculates a correction amount from the manipulation amount u yet to be input to the control object 2 and feeds the correction amount back to the manipulation amount u for the next step.

The second closed loop includes a first arithmetic unit 31, a second arithmetic unit 32, a third arithmetic unit 33 and a fourth arithmetic unit 34 viewed in a signal transmission sequence. The manipulation amount u is input to the first arithmetic unit 31, and the correction amount for the manipulation amount u for the next step is output from the fourth arithmetic unit 34. The first arithmetic unit 31 comprises a delay element (D) 18 and a controller (M) 12. The second arithmetic unit 32 comprises a delay element (D) 19 and a controller ($e^{-(L-4T)s}$) 13. The third arithmetic unit 33 comprises a delay element (D) 20 and a controller (Cdis) 14. The fourth arithmetic unit 34 comprises a delay element (D) 21 and a controller (Cimc) 15.

The delay elements (D) 18, 19, 20 and 21 are elements that delay an input signal by one step and output the delayed signal. $e^{-Ts}$ in the formula (3) is replaced with the delay element (D) as a result of discretization in the process of implementation. With such a configuration, the manipulation amount u for the preceding step is input to the controller 12, an output of the controller 12 for the preceding step is input to the controller 13, an output of the controller 13 for the preceding step is input to the controller 14, and an output of the controller 14 for the preceding step is input to the controller 15. The controller 12 is equivalent to the prediction model ($Me^{-Ls}$) from which a dead time element ($e^{-Ls}$) has been separated. That is, the controller 12 is a prediction model that ignores the dead time element ($e^{-Ls}$). The controller 13 is equivalent to the dead time element ($e^{-Ls}$) from which delay elements ($e^{-Ts}$) for four control periods have been separated. The controller 13 is the dead time element ($e^{-(L-4T)s}$) converted into a rational function by Pade approximation. The controller 14 is corresponds to the disturbance compensator, and the controller 15 corresponds to the IMC filter.

The first closed loop includes a fifth arithmetic unit 35. The fifth arithmetic unit 35 comprises a controller (Cdis) 16 and a controller (Cimc) 17. The controller 16 corresponds to the disturbance compensator, and the controller 17 corresponds to the IMC filter. The sensor value y is input to the controller 16, and the controller 17 outputs a correction amount for the manipulation amount u for the next step. In the fifth arithmetic unit 35, the controllers 16 and 17 sequentially perform operations.

The reference device is implemented in a multi-core computing device. In the implementation, the IMC filter 11, the first arithmetic unit 31, the second arithmetic unit 32, the third arithmetic unit 33, the fourth arithmetic unit 34 and the fifth arithmetic unit 35 are embodied as separate cores. That is, the operation by the IMC filter to convert the target value r into the manipulation amount u, the operation of the transfer function of the second closed loop to feed back the manipulation amount u and the operation of the transfer function of the first closed loop to feed back the sensor value y are separated as different tasks, and the operation of the transfer function of the second closed loop is divided into separate tasks of the operations relating to the four controllers, and the resulting tasks are allocated to six cores in total.

Figure 5:
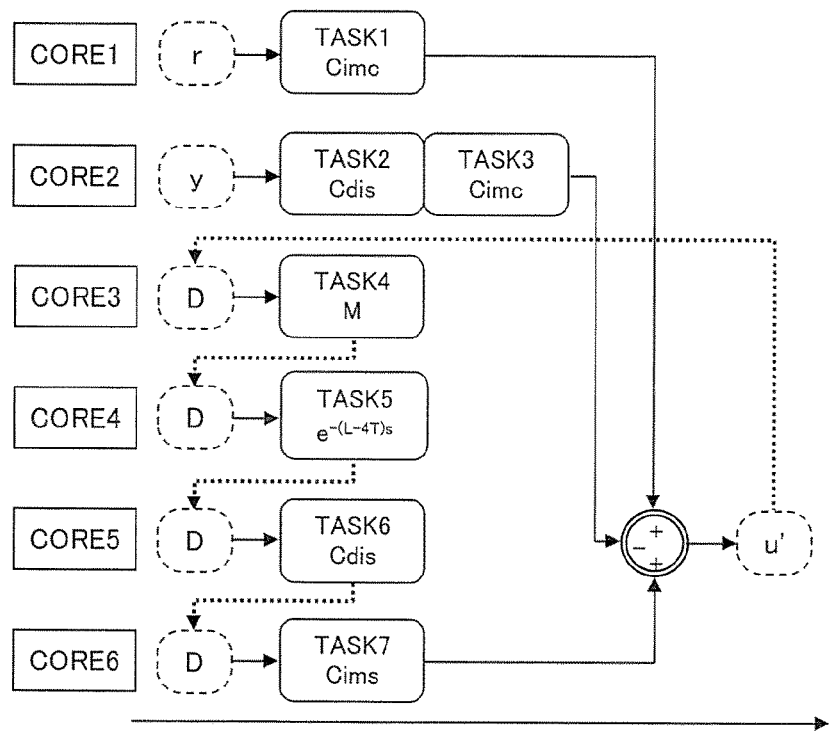
FIG. 5 is a diagram showing a temporal relationship between operations of controllers in a case where the control logic shown in FIG. 4 is implemented in a multi-core computing device.
Figure 6:
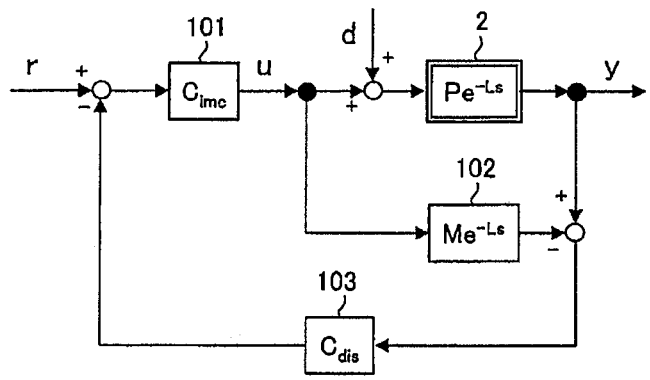
FIG. 6 is a block diagram showing a control logic of a typical internal model control used for a conventional control device.
Figure 7:
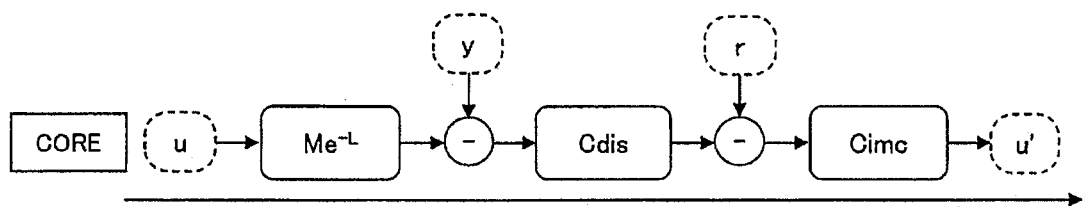
FIG. 7 is a diagram showing a temporal relationship between operations of controllers in a case where the control logic shown in FIG. 6 is implemented in a single-core computing device.
Figure 8:
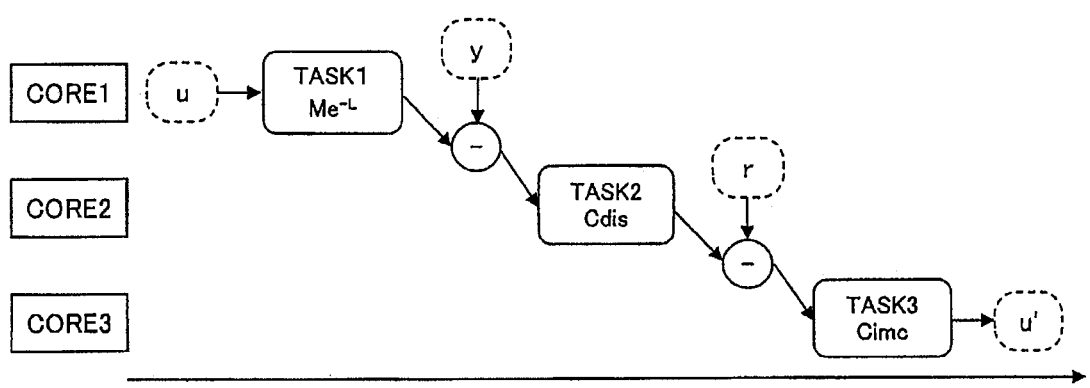
FIG. 8 is a diagram showing a temporal relationship between operations of controllers in a case where the control logic shown in FIG. 6 is implemented in a multi-core computing device.

FIG. 5 is a diagram showing a temporal relationship between operations of the controllers in a case where the control logic shown in FIG. 4 is implemented in a multi-core computing device. In FIG. 5, the horizontal axis is the time axis, and the processings in one step are arranged on the time axis. In this drawing, a task 1 relating to the operation by the IMC filter 11 is allocated to a core 1, and the target value r is input for the task 1. A task 2 relating to the operation by the controller 16 and a task 3 relating to the operation by the controller 17 are allocated to a core 2, and the sensor value y is input for the tasks 2 and 3. In the core 2, the tasks 2 and 3 are sequentially processed.

Tasks relating to the operations by the four controllers of the second closed loop are allocated to cores 3, 4, 5 and 6 in a distributed manner. A task 4 relating to the operation by the controller 12 is allocated to the core 3. For the task 4, the manipulation amount u delayed by one step by the delay element 18, that is, the previous value of the manipulation amount u, is input. A task 5 relating to the operation by the controller 13 is allocated to the core 4. For the task 5, an output of the task 4 delayed by one step by the delay element 19 is input. A task 6 relating to the operation by the controller 14 is allocated to the core 5. For the task 6, an output of the task 5 delayed by one step by the delay element 20 is input. A task 7 relating to the operation by the controller 15 is allocated to the core 6. For the task 7, an output of the task 6 delayed by one step by the delay element 21 is input. Additions and subtractions for calculating the manipulation amount u' for the next step from the outputs of the tasks 1, 3 and 7 are allocated to any one of the cores, preferably, the core that performs the smallest amount of operation. In the example shown in FIG. 5, the core 5 performs the additions and subtractions for calculating the manipulation amount u'.

At the start of the step, the target value r is read via an input port for the task 1, and the sensor value y is read via the input port for the task 2. In addition, at the start of the step, the previous values of the outputs of the delay elements are read for the tasks 4, 5, 6 and 7. In the first step, however, a value set as an initial value at a time 0 is read from the delay elements for the tasks 4, 5, 6 and 7. In any case, with the operations by the cores 3, 4, 5, and 6, as with the operations by the cores 1 and 2, any task can be started without waiting for another core to complete its task(s). Therefore, as with the cores 1 and 2, the cores 3, 4, 5 and 6 can start operations in parallel without waiting for another core to complete its operation.

With the reference device described above, the operations involved with the internal model control, or more specifically, the operations of the second closed loop to feed back the manipulation amount u are distributed among the cores 3, 4, 5 and 6, and the cores 3, 4, 5 and 6 perform operations in parallel. Therefore, the reference device can reduce the operating time required for processing of one step and improve the operating speed as a whole of the device, compared with conventional devices.

However, the reference device can be further improved. In FIG. 5, the core 2 sequentially processes the tasks 2 and 3. The task 2 requires basically the same amount of operation as the task 6 processed by the core 5, and the task 3 requires basically the same amount of operation as the task 7 processed by the core 6. Therefore, comparing the amount of operation between the cores shows that the core 2 requires a markedly larger amount of operation than the other cores. Thus, the operating speed of the whole of the reference device is determined by the operating time of the core 2.

This means that, if the operating time of the core 2 can be reduced, the operating speed of the whole of the device can be further improved.

A control device according to an embodiment of the present invention is an improvement of the reference device in which the operating speed of the whole of the device is further improved.

First, points of improvement of the control device according to this embodiment will be generally described.

The term of the sensor value y in the formula (3) described above includes two elements expressed by the transfer functions Cdis and Cimc. These elements have a sequentiality, so that a delay time needs to be introduced in order to allow parallelization. However, the term of the sensor value y includes no dead time element, and therefore, a delay time cannot be derived from the dead time element, unlike the term of the manipulation amount u.

Figure 2:
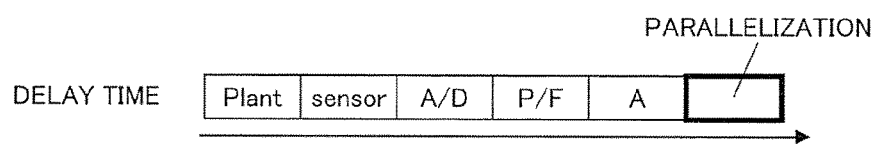
FIG. 2 is a conceptual diagram showing a breakdown of a potential delay time of the whole of a control system.

In this regard, this embodiment focuses attention on a potential delay time that inherently exists in a conventional control system. FIG. 2 is a conceptual diagram showing a breakdown of a potential delay time of the whole of the control system. As shown in this drawing, in a common control system, there are various kinds of delays in addition to a dead time (Plant) of the control object. For example, a sensor delay ("sensor") and an A/D conversion delay ("A/D") are delays caused by hardware, and a platform delay ("P/F"), a task activation delay ("A") and a dead time modeling error are delays caused by software.

In general, dividing a sequential term relating to the sensor value read via the input port into n elements requires a delay time that is (n−1) times as long as a control period T. Delay elements for one control period are disposed between the elements, and an output for the preceding step of the preceding element is used as an input to each of the second and following elements. As a result, each element can start its operation without waiting for another element to complete its operation, so that operations of the n divisional elements can be performed in parallel. If the delay time newly introduced for parallelization is sufficiently smaller than the potential delay time of the whole of the control system, the effect of the introduced delay time on the control performance can be reduced. In the case of the update formula (3), the term of the sensor value y can be divided into two elements, so that the introduced delay time can be one control period. The delay time of one control period is sufficiently smaller than the potential delay time, and therefore, the effect of the delay time on the control performance can be regarded as falling within an acceptable error range.

In this case, the input value processed by the actual control device is the sensor value y delayed by one control period. To reduce the effect of the introduced delay time on the control performance, an equal delay time is desirably introduced into the term of the manipulation amount u, which is in a parallel relationship with the term of the sensor value y. This can be achieved by modifying the dead time of the prediction model by the introduced delay time and modifying the transfer function of the prediction model from $Me^{-Ls}$ to $Me^{-(L+T)s}$. In addition, the transfer function Cdis of the disturbance compensator needs to be redesigned to these modifications. The transfer function of the redesigned disturbance compensator is denoted as Cdis2.

Making the modifications described above to the formula (3) results in a new update formula expressed by the following formula (4).

[Formula 4]

$$u = r * Cimc(s) - y * Cdis2(s) * e^{-Ts}Cimc(s) + \\ u * e^{-Ts}M(s) * e^{-Ts}e^{-((L-4T)+T)s} * e^{-Ts}Cdis(s) * e^{-Ts}Cimc(s) \quad (4)$$

Figure 1:
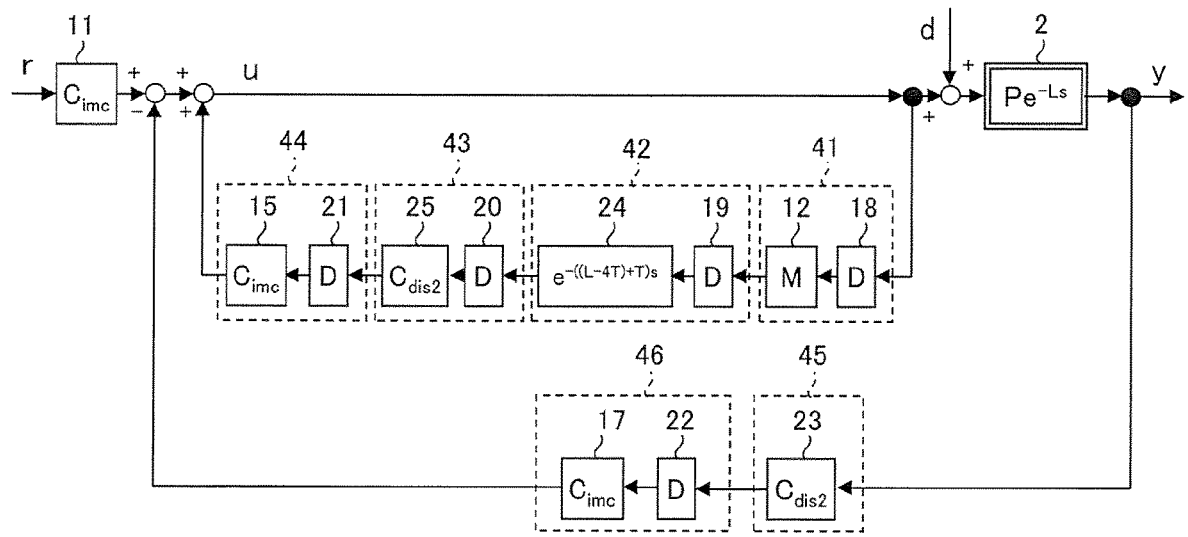
FIG. 1 is a block diagram showing a control logic of an internal model control of a control device according to an embodiment of the present invention.

FIG. 1 is a block diagram showing a control logic of an internal model control of the control device according to this embodiment. The control logic shown in FIG. 1 corresponds to the formula (4) described above. As can be seen from the relationship between the formulas (3) and (4), the control logic shown in FIG. 1 is a modification of the control logic of the reference device shown in FIG. 4. In the control logic shown in FIG. 1, elements denoted by the same reference numerals as those of the control logic shown in FIG. 4 are elements configured the same as those of the reference device.

As with the reference device, in the control device according to this embodiment, two closed loops are formed. A first closed loop is a closed loop that calculates a correction amount from a sensor value y of a control amount output from a control object 2 and feeds the correction amount back to a manipulation amount u for the next step. A second closed loop is a closed loop that calculates a correction amount from the manipulation amount u yet to be input to the control object 2 and feeds the correction amount back to the manipulation amount u for the next step.

The second closed loop includes a first arithmetic unit 41, a second arithmetic unit 42, a third arithmetic unit 43 and a fourth arithmetic unit 44 viewed in the signal transmission sequence. Of these arithmetic units, the first arithmetic unit 41 and the fourth arithmetic unit 44 are common to the first arithmetic unit 31 and the fourth arithmetic unit 34 of the reference device shown in FIG. 4 and are not different from those arithmetic units of the reference device. However, the second arithmetic unit 42 and the third arithmetic unit 43 include a modification from the second arithmetic unit 32 and the third arithmetic unit 33 of the reference device. A controller 24 of the second arithmetic unit 42 has a dead time element $e^{-((L-4T)+T)s}$, which is the dead time element $e^{-(L-4T)s}$ of the controller 13 of the reference device plus a delay element $e^{-Ts}$ for one control period. A controller 25 of the third arithmetic unit 43 uses the transfer function Cdis2 of the modified disturbance compensator.

The first closed loop includes a fifth arithmetic unit 45 and a sixth arithmetic unit 46 viewed in the signal transmission sequence. The sensor value is input to the fifth arithmetic unit 45, and the sixth arithmetic unit 46 outputs a correction amount for the manipulation amount u for the next step. The fifth arithmetic unit 45 comprises only a controller (Cdis2) 23. The controller 23 corresponds to the modified disturbance compensator. On the other hand, the sixth arithmetic unit 46 comprises a delay element (D) 22 and a controller (Cimc) 17. The delay element 22 is an element that delays an input signal by one step and outputs the delayed signal. $e^{-Ts}$ of the term of y in the formula (4) is replaced with the delay element as a result of discretization in the process of implementation. With such a configuration, an output of the controller 23 for the preceding step is input to the controller 17.

The control device according to this embodiment is implemented in a multi-core computing device. In the implementation, the IMC filter 11, the first arithmetic unit 41, the second arithmetic unit 42, the third arithmetic unit 43, the fourth arithmetic unit 44, the fifth arithmetic unit 45 and the sixth arithmetic unit 46 are embodied as separate cores. That is, the operation by the IMC filter to convert the target value r into the manipulation amount u, the operations relating to the four controllers of the second closed loop and the operations relating to the two controllers of the first closed loop are separated as different tasks, and the tasks are allocated to seven cores in total.

Figure 3:
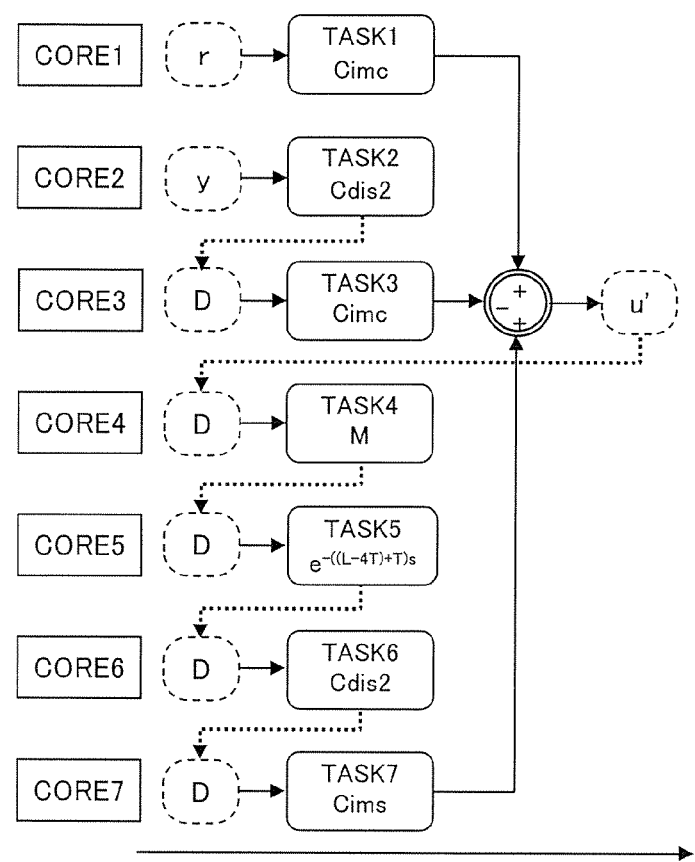
FIG. 3 is a diagram showing a temporal relationship between operations of controllers in a case where the control logic shown in FIG. 1 is implemented in a multi-core computing device.

FIG. 3 is a diagram showing a temporal relationship between operations of the controllers in a case where the control logic shown in FIG. 1 is implemented in a multi-core computing device. In FIG. 3, the horizontal axis is the time axis, and the processings in one step are arranged on the time axis. In this drawing, a task 1 relating to the operation by the IMC filter 11 is allocated to a core 1, and the target value r read via an input port is input for the task 1.

Tasks relating to the operations by the two controllers of the first closed loop are allocated to cores 2 and 3 in a distributed manner. A task 2 relating to the operation by the controller 23 is allocated to the core 2, and the sensor value y read via the input port is input for the task 2. A task 5 relating to the operation by the controller 17 is allocated to the core 3. An output of the task 2 delayed by one step by the delay element 22 is input for the task 3.

Tasks relating to the operations by the four controllers of the second closed loop are allocated to cores 4, 5, 6 and 7 in a distributed manner. For the task 4 relating to the operation by the controller 12 allocated to the core 4, the manipulation amount u delayed by one step by the delay element 18 is input. For the task 5 relating to the operation by the controller 24 allocated to the core 5, an output of the task 4 delayed by one step by the delay element 19 is input. For the task 6 relating to the operation by the controller 25 allocated to the core 6, an output of the task 5 delayed by one step by the delay element 20 is input. For the task 7 relating to the operation by the controller 15 allocated to the core 7, an output of the task 6 delayed by one step by the delay element 21 is input. Additions and subtractions for calculating the manipulation amount u' for the next step from the outputs of the tasks 1, 3 and 7 are allocated to any one of the cores, preferably, the core that performs the smallest amount of operation. In the example shown in FIG. 3, the core 3 performs the additions and subtractions for calculating the manipulation amount u'.

At the start of the step, the target value r is read via the input port for the task 1, and the sensor value y is read via the input port for the task 2. In addition, at the start of the step, the previous values of the outputs of the delay elements are read for the tasks 3, 4, 5, 6 and 7. In the first step, however, a value set as an initial value at a time 0 is read from the delay elements for the tasks 3, 4, 5, 6 and 7. In any case, any core does not need to wait for another core to complete its task before starting its task, and all the cores can start operations in parallel in each step.

As described above, with the control device according to this embodiment, operations by the first closed loop that feeds back the sensor value y are distributed among the cores 2 and 3, and operations by the second closed loop that feeds back the manipulation amount u are distributed among the cores 4, 5, 6 and 7, and all the cores including these cores perform operations in parallel. The tasks are distributed in such a manner that substantially equal amounts of operation are allocated to the cores, so that the operating time of a core is prevented from being markedly longer than the operating times of the other cores. Therefore, with the control device according to this embodiment, the operating time required for processing of one step can be reduced compared with the operating time of the reference device, and the operating speed of the whole of the device can be further improved.

The control object of the control device according to this embodiment may be an internal combustion engine of an automobile. The internal combustion engine may be a spark ignition engine or a diesel engine. For example, if the control object is the spark ignition engine, the control amount may be torque, and the manipulation amount may be throttle. Alternatively, if the control object is the spark ignition engine, the control amount may be torque, and the manipulation amount may be fuel injection amount. If the control object is a supercharged engine, the control amount may be supercharging pressure, and the manipulation amount may be waist gate valve opening or variable nozzle opening. Furthermore, if the control object is an engine provided with an EGR device, the control amount may be EGR rate, and the manipulation amount may be EGR opening.

When the control object is an internal combustion engine, the control period T of the control device can be changed in synchronization with the combustion cycle of the internal combustion engine. Of course, the control period T of the control device may be a fixed value. For example, the control period T may be set with respect to the combustion cycle at the time of maximum permissible rotation of the internal combustion engine.

Furthermore, the control object of the control device according to this embodiment is not limited to the internal combustion engine. For example, the control device according to this embodiment can be applied to a hybrid system of an internal combustion engine and an electric motor or a fuel cell system. The control device according to this embodiment is suitable for a control object that requires real-time online control. In particular, the control device according to this embodiment is suitable for controlling a power unit of a mobile body and particularly suitable as a control device mounted on a mobile body. Of course, the control device according to this embodiment can be applied not only to the power unit of a mobile body but also to a wide variety of control objects including stationary installations.

The present invention is not limited to the embodiment described above, and various modifications can be made without departing form the spirit of the present invention. For example, if all the transfer functions involved with the internal model control are linear transfer functions, the controller 23 of the fifth arithmetic unit 45 and the controller 17 of the sixth arithmetic unit 46 can be interchanged. Furthermore, the controllers 12, 24, 25 and 15 of the first to fourth arithmetic units 41, 42, 43 and 44 are also interchanged.

Although the number of steps by which the delay element 22 of the first closed loop delays the input is preferably one as described in the above embodiment, the delay element 22 may delay the input by a plurality of steps. Similarly, the number of steps by which the delay elements 18, 19, 20 and 21 of the second closed loop delay the respective inputs is also preferably one as described in the above embodiment, the delay elements 18, 19, 20 and 21 may delay the respective inputs by a plurality of steps by adjusting the dead time of the controller 24. In that case, it is necessary only that the sum of the total delay time of the delay elements 17, 18 and 19 and the dead time of the controller 12 is equal to the sum of the dead time of the control object 2 and the delay time of the delay element 22 of the first closed loop.

Although the present invention is applied to the control device that determines the manipulation amount of the control object by internal model control in the embodiment described above, the control algorithm to which the present invention can be applied is not limited to the internal model control. The present invention can be applied to control according to Smith method, which is capable of equivalent transformation with the internal model control, as well as to various kinds of feedback controls such as PI control and PID control.

REFERENCE SIGNS LIST 2 control object
11 IMC filter
12, 15, 17, 23, 24, 25 controller
18, 19, 20, 21, 22 delay element
41, 42, 43, 44, 45, 46 arithmetic unit

The invention claimed is:
1. A control unit comprising:
a plurality of arithmetic units, each arithmetic unit is assigned to a core that is different from the core assigned to all other arithmetic units and configured to execute a task, wherein:
a first arithmetic unit is configured to receive a target value as input via a first input port and execute a first task to generate a first output;
a second arithmetic unit is configured to receive a sensor value via a second input port and perform a second task to generate a second output, wherein the second arithmetic unit is configured to store the second output in a third storage;
a third arithmetic unit is configured to receive a third input from the third storage and execute a third task to generate a third output, wherein the third arithmetic unit is configured to:
execute an arithmetic operation using formula 3 to generate a main output; and

$$u = r*Cimc(s) - y*Cdis(s)*Cimc(s) + u*e^{-Ts}M(s)*e^{-Ts}$$
$$e^{-(L-4T)s}*e^{-Ts}Cdis(s)*e^{-Ts}Cimc(s) \quad \text{[Formula 3]}$$

(wherein in the formula 3, u is a manipulation amount, r is a target value, y is a sensor value Cimc(s) is an internal model controller (IMC) filter transfer function, Cdis(s) is disturbance compensator transfer function, $e^{-Ts}$ is a delay element (D), M(s) is a transfer function element of a prediction model, L is dead time, T is one control period, 4T is four control periods, $e^{-(L-4T)s}$ is a dead time element converted into a rational function by Pade approximation)
store the main output in a fourth storage;
a fourth arithmetic unit is configured to receive a fourth input from the fourth storage and execute a fourth task to generate a fourth output, wherein the fourth arithmetic unit is configured to store the fourth output in a fifth storage;
a fifth arithmetic unit is configured to receive a fifth input from the fifth storage and execute a fifth task to generate a fifth output, wherein the fifth arithmetic unit is configured to store the fifth output in a sixth storage;
a sixth arithmetic unit is configured to receive a sixth input from the sixth storage and execute a sixth task to generate a sixth output, wherein the sixth arithmetic unit is configured to store the sixth output in a seventh storage;
a seventh arithmetic unit is configured to receive a seventh input from the seventh storage and execute a seventh task to generate the seventh output; and
in a start control period, a value of each of the third storage, fourth storage, fifth storage, sixth storage and seventh storage is set to zero;

in each control period:
    all of the arithmetic units receive a respective input simultaneously and generate a respective output; or
    at least part of a task execution of each arithmetic unit overlaps with the task execution of all other arithmetic units.

2. The control unit according to claim 1, wherein the control device is implemented in a multi-core processor that has a plurality of cores, and a different core is used as each of the plurality of arithmetic units.

3. The control unit according to claim 1, wherein the plurality of arithmetic units are configured so that an amount of operation of a controller is uniform between the arithmetic units.

4. The control unit according to claim 1, wherein the control device is configured to determine a manipulation amount of a control object by internal model control, and any one of controllers of the plurality of arithmetic units includes an IMC filter.

5. The control unit according claim 1, wherein the control device is configured to determine a manipulation amount of a control object by internal model control, and any one of controllers of the plurality of arithmetic units includes a disturbance compensator.

6. The control unit of claim 1, wherein:
    the first task is a first operation by an IMC filter;
    the second task is a modified disturbance compensator;
    the third task is a third operation by an IMC filter;
    the fourth task is a prediction model;
    the fifth task is a dead time element (e−(L−4T)s) converted into a rational function by Pade approximation;
    the sixth task is a disturbance compensator; and
    the seventh task is a seventh operation by an IMC filter.

7. The control unit of claim 1, wherein the control unit determines the third output of a control object by feedback control so as to bring a control amount of the control object closer to the target value.

8. The control unit according to claim 7, wherein the control object is an internal combustion engine, and a control period of the control device is set with respect to a combustion cycle of the internal combustion engine at the time of maximum permissible rotation.

9. The control unit according to claim 7, wherein the control object is an internal combustion engine, and a control period of the control device is changed in synchronization with a combustion cycle of the internal combustion engine.

10. The control unit of claim 1, wherein the arithmetic units execute tasks in parallel.

11. The control unit of claim 1, wherein the plurality of arithmetic units are arranged in a first closed loop and a second closed loop, where each of the first closed loop and the second closed loop include at least one of the arithmetic units other than the second arithmetic unit.

12. A control device that determines a manipulation amount of an internal combustion engine by feedback control so as to bring a control amount of the internal combustion engine closer to a target value, comprising:
    a plurality of arithmetic units is configured to operate in parallel using formula 4, $$u = r*Cimc(s) - y*Cdis2(s)*e^{-Ts}Cimc(s) + u*e^{-Ts}M(s)*e^{-Ts}e^{-((L-4T)+T)s}*e^{-Ts}Cdis(s)* e^{-Ts}Cimc(s) \quad \text{[Formula 4]}$$

(wherein in the formula 4, u is a manipulation amount, r is a target value, y is a sensor value Cimc(s) is an internal model controller (IMC) filter transfer function, Cdis(s) is disturbance compensator transfer function, Cdis2(s) is modified disturbance compensator transfer function of the Cdis(s), $e^{-Ts}$ is a delay element (D), M(s) is a transfer function element of a prediction model, L is dead time, T is one control period, 4T is four control periods, $e^{-(L-4T)s}$ is a dead time element converted into a rational function by Pade approximation)
    wherein the plurality of arithmetic units are configured so that a signal is sequentially transmitted by the arithmetic units, a sensor value of the control amount is input to a first arithmetic unit in a signal transmission sequence, and a correction amount for the manipulation amount is output from a last arithmetic unit in the signal transmission sequence,
    the first arithmetic unit has a controller that produces an output by processing the sensor value of the control amount,
    the arithmetic units other than the first arithmetic unit have a delay element that delays an input by one control period and each of the arithmetic units other than the first arithmetic unit has a controller that produces an output by processing the input delayed by the delay element,
        wherein the one control period of the control device is set with respect to a combustion cycle of the internal combustion engine at the time of maximum permissible rotation,
    the delay of the input results in parallel operation of the plurality of arithmetic units, and
    the plurality of arithmetic units are arranged in a first closed loop and a second closed loop, where each of the first closed loop and the second closed loop include at least one of the arithmetic units other than the first arithmetic unit having the delay element.

* * * * *